United States Patent [19]

Jordan et al.

[11] 4,188,772
[45] Feb. 19, 1980

[54] HYDRAULIC SPEED CONTROL SYSTEM FOR THE PICK-UP REEL OF A PEANUT COMBINE

[75] Inventors: Betram L. Jordan; John D. Mitchell, both of Lewiston, N.C.

[73] Assignee: Harrington Manufacturing Company, Lewiston, N.C.

[21] Appl. No.: 934,007

[22] Filed: Aug. 16, 1978

Related U.S. Application Data

[63] Continuation-in-part of Ser. No. 803,523, Jun. 6, 1977, abandoned.

[51] Int. Cl.² ............................................. A01D 69/00
[52] U.S. Cl. ............................... 56/10.2; 56/DIG. 15
[58] Field of Search ............... 56/10.2, 11.9, DIG. 15; 60/428, 429, 430

[56] References Cited

U.S. PATENT DOCUMENTS

| | | | |
|---|---|---|---|
| 2,876,623 | 3/1959 | Slomer | 60/428 |
| 2,891,771 | 6/1959 | Ashton | 60/428 |
| 3,093,946 | 6/1963 | Pitt et al. | 56/10.2 |
| 3,589,109 | 6/1971 | Payne | 56/10.2 |
| 3,609,947 | 10/1971 | Herbsthofer et al. | 56/10.2 |
| 3,623,304 | 11/1971 | Molzahn | 56/10.2 |
| 3,686,838 | 8/1972 | Comeav | 56/10.2 |
| 3,800,517 | 4/1976 | Frushour et al. | 56/10.2 |
| 3,908,376 | 9/1975 | Steiger | 60/428 |
| 3,916,624 | 11/1975 | Machens et al. | 60/428 |
| 3,975,890 | 8/1976 | Rodger | 56/10.2 |
| 3,999,359 | 12/1976 | Jordan et al. | 56/10.2 |

*Primary Examiner*—Russell R. Kinsey
*Assistant Examiner*—Paul J. Hirsch
*Attorney, Agent, or Firm*—Mills & Coats

[57] ABSTRACT

The present invention relates to a hydraulic speed control system for controlling the peripheral speed of a pick-up reel rotatively mounted about the front of a peanut combine. During the harvesting operation, the hydraulic speed control system is adapted to drive the pick-up reel at a generally constant speed as long as the ground speed of the peanut combine is equal to or less than a selected speed. The hydraulic control system is responsive to the ground speed of the peanut combine such that once the ground speed exceeds said selected speed, the hydraulic control system then drives the pick-up reel in proportion to ground speed such that the peripheral speed of the reel is generally equal the harvester ground speed in order that the relative velocity between the entering crop material being delivered to the combine by the reel and the combine itself is generally zero.

12 Claims, 4 Drawing Figures

HYDRAULIC SPEED CONTROL SYSTEM FOR THE PICK-UP REEL OF A PEANUT COMBINE

This is a continuation-in-part application of U.S. Pat. application Ser. No. 803,523, filed June 6, 1977, now abandoned.

The present invention relates to agricultural machinery and more particularly to a peanut combine having a pick-up reel rotatively mounted transversely across the front thereof and provided with a hydraulic speed control system for continuously controlling the peripheral speed of the pick-up reel during harvesting operations.

BACKGROUND OF THE INVENTION

To harvest peanuts, it is conventional practice to first dig the peanuts from the ground and to allow the peanuts and associated crop material to lie about the ground where over a period of time the peanuts tend to dry. After this, a peanut harvester moves through the field where a front mounted pick-up reel engages the lying crop material and the associated peanuts and delivers the same into the peanut harvester or combine where the peanuts are separated from the above ground crop material, vines and roots, etc.

It has been conventional to drive the pick-up reel of a peanut combine at a constant speed irrespective of the ground speed of the harvester or the density of the crop. Thus, in such case there is no correlation between the ground speed of the peanut combine and the pick-up reel and this often results in the pick-up reel jerking and snatching the peanut crop material and the peanuts being jarred from the root structure of the plant prior to entering the combine. This, of course, gives rise to what is termed "field losses".

Also, it should be pointed out that in the case of a constant speed pick-reel that it is possible to overload the combine in areas where the crop material is relatively dense and the speed of the combine is not altered so as to reduce the load during the harvesting operation. The continuous overloading of the combine will naturally wear the internal structure of the combine and will generally decrease the life of the internal thrashing and harvesting components of the combine. In addition, the overloading of the combine can result in actual clogging and the possibility that such an overload will damage or break certain internal components of the combine.

SUMMARY OF THE INVENTION

The present invention relates to a hydraulic control system for controlling the peripheral speed of a pick-up reel rotatively mounted about the front of a peanut combine during the peanut harvesting operation. As a part of the hydraulic control system, there is provided a hydraulic pump that is driven at a generally constant speed and which is communicatively connected to a hydraulic motor connected to the reel for driving the reel at a constant speed. Also provided as a part of the hydraulic control system is a second hydraulic pump that is driven in proportion to the ground speed of the peanut combine. The hydraulic control system is designed such that as long as the ground speed of the peanut combine is equal to or less than a selected speed the reel is effectively driven at a constant peripheral speed by the output of the first hydraulic pump. But when the ground speed of the combine exceeds said selected speed the second pump is effective to draw additional fluid from a fluid source and this fluid is combined with the fluid output of the first pump to drive the reel at a peripheral speed that is generally equal to the ground speed of the peanut combine. Consequently then, it is appreciated that irrespective of ground speed the reel is driven at a constant speed as long as the ground speed is equal to or less than the selected threshold speed. Where the ground speed of the peanut combine exceeds the selected speed, then the hydraulic control system is effective to drive the reel such that the peripheral speed thereof is generally equal to the ground speed of the peanut combine.

It is, therefore, an object of the present invention to provide a speed control system for controlling the speed of a harvester's reel such that at relatively low ground speeds the reel is driven at a speed that is effective and efficient, and at relatively higher ground speeds the speed of the reel is controlled relative to the harvester's ground speed such that the reel gently engages the crop material during the harvesting operation and feeds the crop material into the harvester without jerking and snatching the crop so as to minimize field losses.

A further object of the present invention is to provide an automatic speed control system for controlling the speed of a harvester reel relative to the harvester's ground speed during selected portions of the harvesting operation that is relatively simple, effective and reliable.

Still a further object of the present invention is to provide a hydraulic speed control system for controlling the peripheral speed of a combine pick-up reel such that the reel speed is generally constant as long as the ground speed of the combine is equal to or less than a selected speed, and wherein once the ground speed of the peanut combine exceeds said selected speed, then the hydraulic control system acts to maintain the peripheral speed of the reel at a speed generally equal to the ground speed of the peanut combine.

It is also an object of the present invention to provide a hydraulic control system for controlling the peripheral speed of a pick-up reel for a combine wherein the hydraulic control system includes a pair of cooperating hydraulic pumps, one pump being driven at a constant speed and the other pump being driven at a speed in proportion to the actual ground speed of the combine, and wherein the two pumps cooperate to drive the pick-up reel at a generally constant speed as long as the ground speed is equal to or less than a selected speed and at a speed generally corresponding to the ground speed of the peanut combine when the ground speed of the peanut combine exceeds a selected speed.

Other objects and advantages of the present invention will become apparent from a study of the following description and the accompanying drawings which are merely illustrative of the present invention.

DESCRIPTION OF PREFERRED EMBODIMENT

Figure 3:
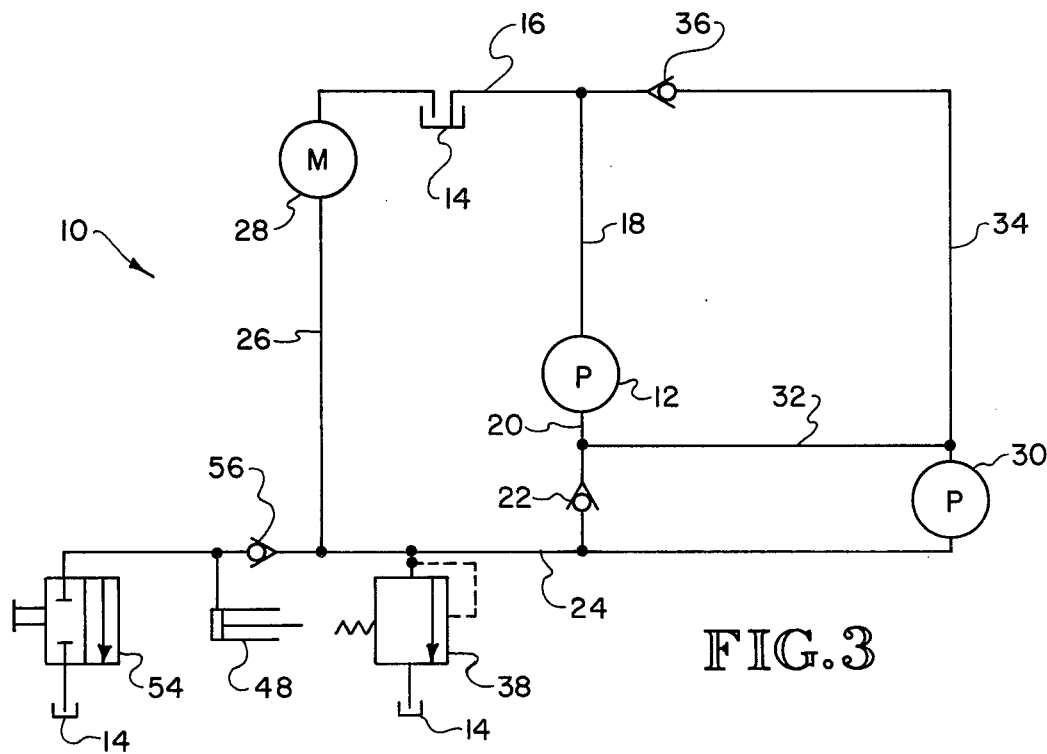
FIG. 3 is a schematic diagram of the hydraulic speed control system of the present invention.

With further reference to the drawings, particularly FIG. 3, the hydraulic control system for controlling the peripheral speed of a pick-up reel for an agricultural harvesting machine such as a peanut combine, is shown therein and indicated generally by the numeral 10. A detailed discussion of a peanut combine will not be dealt with herein because the hydraulic control system 10 is basically adapted to be utilized with a conventional peanut combine and the structure and basic components thereof are well understood and appreciated by those skilled in the art. For an understanding and appreciation of a peanut combine, one is referred to U.S. Pat. No. 3,975,890 and U.S. Pat. No. 3,800,517, both of which are expressly incorporated herein by reference.

Briefly reviewing the basic structure of a combine, a crop pick-up reel is rotatively mounted about the front of the peanut combine and during the peanut harvesting operation engages peanut crop material lying on the ground and conveys or transfers the crop material into a front crop intake area of the peanut combine as the same moves through the field. The reel is rotatively mounted and in the case of the present disclosure would be driven by a hydraulic motor 28 that would be adapted to be connected to the reel such that the output shaft of the hydraulic motor would drive the reel as hydraulic fluid is pumped therethrough.

Turning now to a discussion of the hydraulic control system 10 for controlling the speed of the hydraulic motor 28 and consequently the speed of the pick-up reel, it is seen that the hydraulic control system includes a first hydraulic pump 12 that is connected about the inlet side by lines 18 and 16 to the hydraulic fluid tank or reservoir 14. Hydraulic pump 12 is operative to direct a fluid output through line 20 and check valve 22 contained therein, and on through lines 24 and 26 to the hydraulic motor 28.

In accordance with the preferred embodiment shown herein, hydraulic pump 12 is driven by a generally constant drive source and preferably this is the pto drive associated with the peanut combine. Consequently, in the case of a constant speed pto drive driving the hydraulic pump 12, it is appreciated that the hydraulic pump 12 would have a fluid output that would always be generally constant irrespective of the ground speed of the peanut combine.

In addition, the hydraulic speed control system 10 includes a ground speed pump 30 that is connected about the inlet side by lines 32 and 34, with line 34 including a check valve 36 therein that will permit fluid to flow from the reservoir 14 to the ground speed hydraulic pump 30 but not in a reverse direction. The outlet side of the ground speed pump 30 is connected to line 24 which enables pump 30 to direct fluid to the hydraulic motor 28 that drives the pick-up reel.

Figure 1:
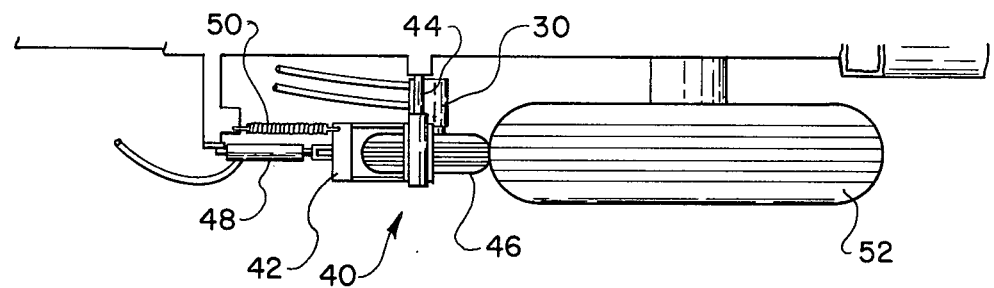
FIG. 1 is a fragmentary plan view of a gauge wheel assembly and an associated hydraulic pump forming a part of the hydraulic speed control system of the present invention.

As pointed out above, hydraulic pump 30 is referred to as a ground speed hydraulic pump in that the same is driven in proportion to ground speed during the peanut harvesting operation. To provide for this ground speed drive, the peanut combine, as shown in FIGS. 1 and 2, is provided with a gauge wheel assembly 40 that during the harvesting operation engages a ground engaging wheel 52 of the combine such that as the combine wheel 52 rotates, the gauge wheel assemly 40 is likewise driven by the frictional engagement between the two wheels.

Viewing the gauge wheel assembly 40 in detail, it is seen that the same includes a wheel frame 42 rotatively supported about a transverse shaft 44 extending outwardly from one side of the peanut combine just forwardly of the ground engaging wheel 52. Rotatively mounted within the wheel frame 42 is a gauge wheel 46 that is operatively connected to the ground speed hydraulic pump 30, as shown in FIG. 1, such that the rotation of the gauge wheel results in the ground speed pump 30 being driven.

Figure 2:
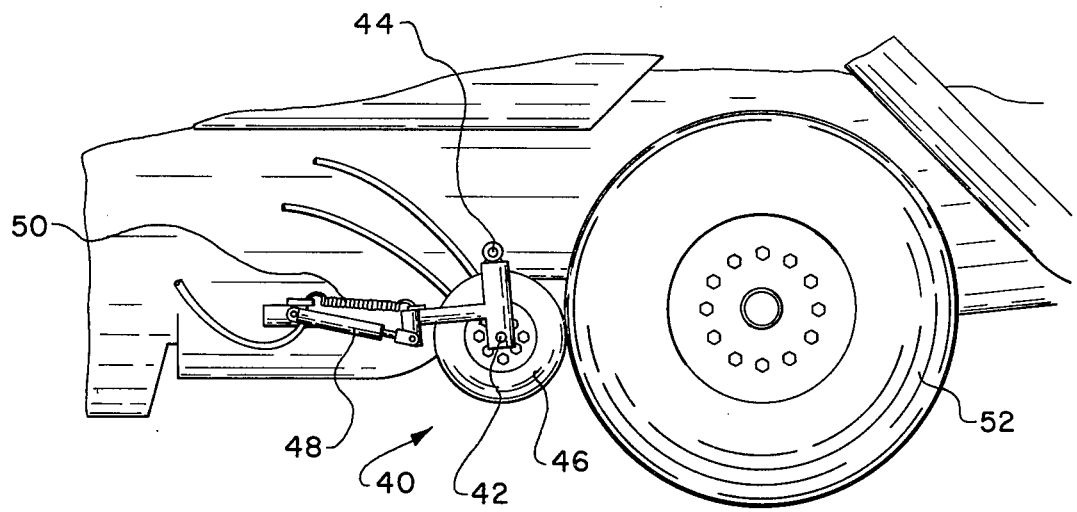
FIG. 2 is a fragmentary side elevational view of the gauge wheel assembly and associated hydraulic pump shown in FIG. 1.

A single acting hydraulic cylinder 48 is anchored adjacent the side of the combine, as illustrated in FIG. 2, and is operatively connected to the wheel frame 42 for rotatively moving the wheel frame 42 about shaft 44 for causing the gauge wheel 46 supported therein to engage the combine ground engaging wheel 52. The wheel frame 42 is biased to a nonengaging position by a spring 50 that extends between an anchor point adjacent the side of the combine shown in FIG. 2 and the wheel frame 42 itself.

As illustrated in FIG. 3, the hydraulic cylinder 48 is connected in line 24 between a check valve 56 and a control valve 54. Control valve 54 is shown in the "on" position in that fluid being pumped by either or both hydraulic pumps 12 and/or 30 would be directed into one end of the hydraulic cylinder 48 causing the piston therein to be extended and the wheel frame 42 to be rotated counterclockwise as viewed in FIG. 2 so as to cause the gauge wheel 46 to frictionally engage the combine wheel 52.

In the "off" position, fluid passing through the check valve 56 towards the control valve 54 would be directed straight through the valve 54 instead of into the cylinder 48 and on to the storage tank or reservoir 14.

In operation, when the peanut combine is idle or stationary and the pto drive that drives hydraulic pump 12 is started, fluid is pumped from the reservoir 14 through lines 16 and 18, and through the pump 12. Because the peanut combine is idled, the ground speed hydraulic pump 30 remains stationary and the pressure resulting from the fluid output of hydraulic pump 12 is equal on both sides of the ground speed pump 30 such that it remains stationary and the full output of hydraulic pump 12 is routed to the hydraulic motor 28 for driving the pick-up reel of the peanut combine.

Before beginning the harvesting operation, control valve 54 is actuated such that the hydraulic cylinder 48 is actuated and the wheel frame 42 is pushed towards wheel 52 such that gauge wheel 46 is maintained in a frictional drive relationship with the ground engaging wheel 52 of the peanut combine. As the combine begins to move through the field, the ground speed pump 30 is driven by the gauge wheel 46 and hydraulic pump 30 acts to receive a portion of the output flow from hydraulic pump 12 and that portion received is exhausted through line 24 and combines with any remaining output flow of the hydraulic pump 12 to again deliver fluid to the hydraulic motor 28. It is appreciated that hydraulic pump 12 is a priority source of fluid for the ground speed hydraulic pump 30 and that as long as there is available fluid output from hydraulic pump 12 that the ground speed pump 30 will receive this fluid and deliver such to the hydraulic motor 28.

But once the ground speed of the peanut combine has reached a certain speed the full output of hydraulic pump 12 is consumed and pumped by the ground speed pump 30. It is at this point where the ground speed pump 30 begins to draw additional fluid from the reservoir 14 through line 16 and the check valve 36 and on through line 34 where the additional fluid combines with the fluid output of the hydraulic pump 12. The ground speed pump 30 is of the type that produces a variable fluid output that varies with the driven speed. The capacity and constant drive speed of the hydraulic pump 12 is selected such that the reel driven by the hydraulic motor 28 will be driven at a certain desired constant speed by the output of the hydraulic pump 12. In accordance with a preferred design for the hydraulic control system of the present invention, a ground speed is selected at which point it would be desirable for the reel to be driven at a peripheral speed generally equal to the ground speed of the peanut combine as long as the ground speed exceeded the selected speed. In this regard, the hydraulic pump 30 and the hydraulic pump 12 and drive therefor is selected and designed such that the ground speed hydraulic pump 30 will not effectively transmit additional fluid outside of the output of the hydraulic pump 12 until the ground speed of the peanut combine has exceeded the selected speed, at which point it is desirable for the reel to be driven at a speed generally equal to the ground speed as contrasted to a constant speed which is desirable as long as the ground speed of the peanut combine is equal to or less than the selected threshold speed or speed where the transition takes place.

It should be noted that a pressure relief valve 38 is provided to protect the reel and the hydraulic control system 10 in case of an overload or some other obstruction engaging the reel. In such a case, the fluid flowing from line 24 would be directed through the pressure relief valve 38 back to the fluid source or tank 14.

Figure 4:
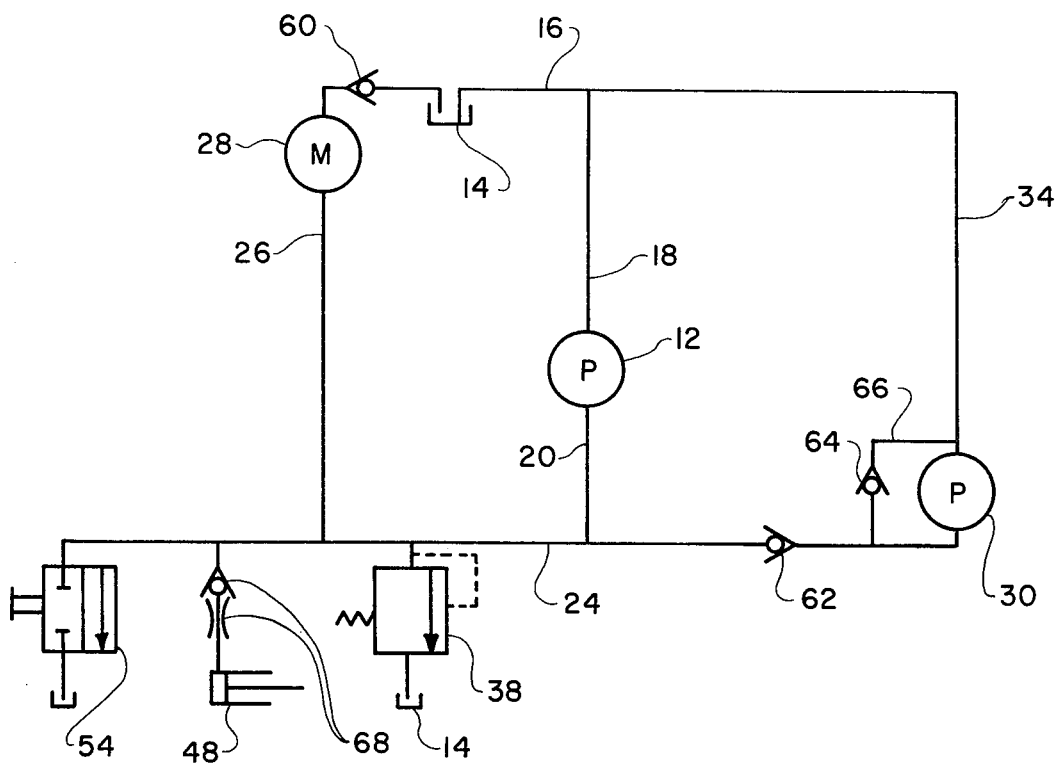
FIG. 4 is a schematic drawing of a second design of the hydraulic speed control system of the present invention.

With respect to FIG. 4, a second design is shown for the hydraulic speed control system for controlling the speed of the peanut combine's reel. This particular design includes the basic components of the control system shown in FIG. 3 and as discussed hereinabove, that is pumps 12 and 30, hydraulic motor 28, valves 38 and 54, and hydraulic cylinder 48. In addition, the structure of the gauge wheel 46 and the associated structure shown in FIGS. 1 and 2 remains the same.

The basic distinction of the design shown in FIG. 4, as contrasted to that in FIG. 3, relates to the particular placement of three check valves 60, 62 and 64 in the system along with a by-pass or reverse oil flow path line 66 about the ground speed pump 30. This allows for fluid to be pumped through line 66 when the combine is being driven rearwardly.

In addition, there is provided a check-restrictor valve 68 that is disposed within the line prior to the entry of the line into the hydraulic cylinder 48. As is appreciated within the art, the check-restrictor 68 allows generally free flow into the cylinder, while the restriction portion includes a small port or hole approximately one-thirty-seconds of an inch that allows fluid flow from the cylinder 48 back into line 24. In effect, this relieves the pressure of the gauge wheel 46 against the ground engaging reel 52 and allows the gauge wheel 46 to engage the ground engaging wheel 52 in a gentle but firm relationship without creating an undue load.

In basic operation of the hydraulic control system illustrated in FIG. 4, pump 12 is driven by a constant speed source such as a pto drive and is operative to drive hydraulic motor 48 and the combine reel at a constant speed irrespective of the ground speed of the harvester. Pump 30 is driven by gauge wheel 46 and pulls fluid from the reservoir 14 through line 34 through check valve 62 and line 24 and to hydraulic motor 28. During operation, the fluid output of pump 30 combines with the fluid output of pump 12 to drive hydraulic motor 28 in proportion to the ground speed of the harvester and to vary and control the speed of the reel in accordance with changes in the harvester's ground speed. Pump 30 and pump 12 are selected such that once a selected ground speed is reached by the harvester, that the combined fluid outputs of pumps 12 and 30 will drive hydraulic motor 28 such that the peripheral speed of the reel is generally equal and/or in proportion to the harvester's ground speed.

The terms "upper", "lower", "forward", "rearward", etc., have been used herein merely for the convenience of the foregoing specification and in the appended claims to describe the hydraulic speed control system for the pick-up reel of a peanut combine and its parts as oriented in the drawings. It is to be understood, however, that these terms are in no way limiting to the invention since the hydraulic speed control system for the pick-up reel of a peanut combine may obviously be disposed in many different positions when in actual use.

The present invention, of course, may be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced herein.

What is claimed is:

1. In a harvesting machine having a crop engaging reel rotatively mounted about the front of a harvester, the improvment comprising a hydraulic speed control system for automatically controlling the peripheral speed of said reel of said crop harvesting machine during a crop harvesting operation such that the peripheral speed of said reel is generally constant until the harvester's ground speed exceeds a selected speed at which time the hydraulic control system is operative to drive the reel such that the peripheral speed thereof is controlled in accordance with harvester ground speed, said hydraulic speed control system comprising: a first pump means operatively connected to a generally constant drive source and operatively connected to a source of hydraulic fluid for pumping a generally constant output flow of fluid; a hydraulic motor operatively connected to said reel for rotatively driving the same, and wherein said hydraulic motor is operatively connected in said speed control system and to said first pump means such that the fluid output from said first pump means may be directed to said hydraulic motor for driving said reel at a generally constant peripheral speed while said harvester is stationary; a second pump means operatively connected in said hydraulic control system for directing fluid from a fluid source to said hydraulic motor and wherein said second pump means is operatively connected to a second drive source that is responsive to ground speed and which acts to drive said second pump means at a speed proportional to ground speed; and wherein said second pump means is operatively associated with said first pump means for cooperating therewith to drive said reel at a generally constant speed as long as the harvester ground speed is equal to or less than a selected speed, and wherein while the harvester ground speed is equal to or less than said selected speed, said second pump means is effective to first pump portions of the output flow of said first pump means to said hydraulic motor while said first pump means is effective to pump any remaining portions of the output flow therefrom to said hydraulic motor such that the generally constant volumetric output of said first pump means is directed to said hydraulic motor driving said reel while said harvester ground speed is equal to or less than the said selected speed; and wherein said second pump means is operative to draw fluid from said fluid source when said harvester ground speed exceeds said selected speed and the drawn fluid is combined with the output flow of said first pump means to drive said hydraulic motor at a speed proportional to ground speed as long as said ground speed of said harvester exceeds said selected speed, such that the peripheral speed of said reel is generally equal to the harvester ground speed.

2. The harvester and hydraulic speed control system of claim 1 wherein said second drive source for driving said second pump means includes a gauge wheel operatively connected to said second pump means for driving the same, and wherein said gauge wheel normally engages a ground engaging wheel of said harvester and is driven by said ground engaging wheel.

3. The harvest and hydraulic control system of claim 2 wherein said hydraulic control system includes a hydraulic cylinder operative to move said gauge wheel from a nonengaged position to an engaged position with said ground engaging wheel of said combine and for maintaining engagement of said gauge wheel with said ground engaging wheel of said combine.

4. The harvester and hydraulic speed control system of claim 3 wherein said gauge wheel is rotatively mounted in a wheel frame and wherein said wheel frame is pivotably mounted about a transverse axis adjacent said ground engaging wheel of said combine; and wherein said hydraulic cylinder is operatively connected to said wheel frame for pivoting the same about said transverse axis and wherein spring means is operatively connected to said wheel frame for biasing the same towards said nonengaged position.

5. In a mobile agricultural harvesting machine having a crop engaging reel rotatively mounted about the front thereof, the improvement comprising a hydraulic dual input speed control system for controlling the speed of said reel during harvesting such that the reel may be driven at speeds proportional to the ground speed of said harvesting machine but at a speed at least equal to a selected initial speed irrespective of the ground speed of said harvesting machine, said dual input speed control system comprising: a hydraulic motor operatively connected to said reel for driving the same; a first hydraulic pump operatively connected to a source of hydraulic fluid and operative when driven to pump fluid to said hydraulic motor and consequently to drive said reel; constant drive means operatively connected to said first hydraulic pump for driving the same at a generally constant speed such that said hydraulic motor and said reel operatively connected thereto may be driven independently of the ground speed of said harvesting machine and at a speed at least equal to said selected initial speed irrespective of the ground speed of said harvesting machine; a second hydraulic pump independent of said first hydraulic pump and operatively connected in said hydraulic control system for also driving said hydraulic motor; and second variable speed drive means independent of said first constant speed drive means and operatively connected to said second hydraulic pump for driving the same, said second variable speed drive means including means for effectively sensing the ground speed of said harvesting machine and for driving said hydraulic motor and the reel in proportion to ground speed such that said reel during certain portions of the harvesting operation is driven by both said first and second pumps so as to give rise to a dual input hydraulic speed control system for the reel of said harvesting machine.

6. The agricultural harvesting machine and hydraulic speed control system for the reel thereof as recited in claim 5, wherein said second variable speed drive means includes a gauge wheel operatively connected to said second pump for driving the same, and wherein said gauge wheel is operatively mounted adjacent a ground engaging reel of said harvesting machine and selectively engageable therewith and wherein said gauge wheel is driven by said ground engaging wheel of said harvesting machine when said gauge wheel is actually engaged therewith.

7. The harvesting machine and hydraulic speed control system for controlling the speed of said reel, as recited in claim 6, wherein said hydraulic control system includes a hydraulic control cylinder operative to move said gauge wheel from a nonengaged position to an engaged position with said ground engaging wheel of said harvesting machine and for maintaining engagement of said gauge wheel with said ground engaging wheel; and wherein said gauge wheel is rotatively mounted in a wheel frame and wherein said wheel frame is pivotably mounted about a transverse axis adjacent said ground engaging wheel of said harvesting machine such that the selected actuation of said hydraulic cylinder is operative to move said frame about said axis such that said gauge wheel may move back and forth between said engaged and nonengaged positions, and wherein spring means is operatively connected to said wheel frame for biasing the same towards said nonengaged position.

8. In a mobile agricultural harvesting machine having a crop engaging reel rotatively mounted about the front thereof, the improvement comprising a hydraulic control system for controlling the speed of said reel during harvesting such that the reel is driven at a speed at least equal to a selected initial speed independently of the ground speed of said harvesting machine and at a speed generally proportional to the ground speed of said harvesting machine during periods of actual harvesting as said harvesting machine is moving through the field, said hydraulic control system comprising a hydraulic motor operatively connected to said reel for driving the same; speed control means associated with said hydraulic control system and responsive to ground speed of said harvesting machine for driving said reel at either a speed at least equal to said initial selected speed or at a peripheral speed generally proportional to the ground speed of the harvesting machine; and wherein said speed control means includes a first fluid pumping means operatively connected to said hydraulic motor and including a generally constant speed drive means for driving said first fluid pumping means such that said hydraulic motor is effectively driven by said first fluid pumping means such that the speed of said reel is maintained at a speed at least equal to the speed of said selected initial speed; and wherein said speed control means further includes a second fluid pumping means independent of said first fluid pumping means and operatively connected to said hydraulic motor and including variable speed drive means responsive to the ground speed of said harvesting machine for effectively driving said second fluid pumping means and said hydraulic motor at a speed proportional to the ground speed of said harvesting machine during periods of actual harvesting as said harvesting machine moves through the field such that the speed of said reel is controlled and maintained at a speed generally proportional to the ground speed of said harvesting machine.

9. The agricultural harvesting machine and the hydraulic speed control system for controlling the speed of the reel of claim 8 wherein said drive means for second fluid pumping means includes a gauge wheel operatively connected to said second fluid pumping means, and wherein during harvesting said gauge wheel normally engages a ground engaging wheel of said agricultural harvesting machine and is driven by said ground engaging reel.

10. The agricultural harvesting machine and the hydraulic speed control system for controlling the speed of the reel of claim 9 wherein said hydraulic control system includes a hydraulic cylinder operatively connected to said gauge wheel for moving the same from a nonengaged position to an engaged position with said ground engaging wheel of said agricultural harvesting machine and for maintaining engagement of said gauge wheel with said ground engaging wheel.

11. The agricultural harvesting machine and the hydraulic speed control system for controlling the speed of the reel of claim 10 wherein said gauge wheel is rotatively mounted in a wheel frame and wherein said wheel frame is pivotably mounted about a transverse axis adjacent said ground engaging wheel of said agricultural harvesting machine; and wherein said hydraulic cylinder is operatively connected to said wheel frame for pivoting the same about said transverse axis and wherein frame means is operatively connected to said wheel frame for biasing the same towards said nonengaged position.

12. The agricultural harvesting machine and hydraulic speed control system for controlling the speed of the reel, as recited in claim 11, wherein said hydraulic control system includes means for limiting the pressure exerted by said gauge wheel against said ground engaging wheel of said agricultural harvesting machine.

\* \* \* \* \*